US006326714B1

United States Patent
Bandera

(10) Patent No.: US 6,326,714 B1
(45) Date of Patent: Dec. 4, 2001

(54) TWO-AXIS POINTING MOTOR

(75) Inventor: Pablo Bandera, Agoura Hills, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 09/428,249

(22) Filed: Oct. 27, 1999

(51) Int. Cl.$^7$ .............. H02K 21/12; H02K 7/06; H02K 21/00; H02K 1/12
(52) U.S. Cl. .............. 310/156.38; 310/82; 310/152; 310/254
(58) Field of Search ............... 310/46, 82, 152, 310/156, 254, 258, 259; 901/29, 30, 38

(56) References Cited

U.S. PATENT DOCUMENTS

| | | | | |
|---|---|---|---|---|
| 825,252 | * | 7/1906 | Vogel | 310/261 |
| 829,801 | * | 8/1906 | Pratt et al. | 310/261 |
| 994,058 | * | 5/1911 | Coates | 310/261 |
| 4,611,863 | * | 9/1986 | Isely | 310/90.5 |
| 4,719,381 | * | 1/1988 | Miles | 310/166 |
| 4,739,241 | * | 4/1988 | Vachtsevanos et al. | 318/800 |
| 4,785,212 | * | 11/1988 | Downer et al. | 310/90.5 |
| 4,828,376 | * | 5/1989 | Padera | 350/500 |
| 4,874,998 | * | 10/1989 | Hollis, Jr. | 318/568.21 |
| 5,007,292 | * | 4/1991 | Crowe et al. | 73/654 |
| 5,204,570 | * | 4/1993 | Gerfast | 310/156 |
| 5,413,010 | * | 5/1995 | Nakanishi et al. | 74/5.22 |
| 5,609,230 | * | 3/1997 | Swinbanks | 188/267 |
| 5,798,590 | * | 8/1998 | Sakakibara | 310/156 |
| 5,808,395 | * | 9/1998 | Anders et al. | 310/266 |
| 6,127,762 | * | 10/2000 | Pedlar | 310/261 |

* cited by examiner

Primary Examiner—Nicholas Ponomarenko
Assistant Examiner—Dang Dinh Le
(74) Attorney, Agent, or Firm—Phillips, Lytle, Hitchcock, Blaine & Huber LLP

(57) ABSTRACT

The present invention provides an improvement in a two-axis pointing motor (20) having a frame (21) and an armature (22). The armature has an axis (x-x) passing through a point (P). The armature is mounted on the frame for controlled omni-directional pivotal movement of the axis about the point. The motor has a permanent magnet (24) mounted on the armature, and has a plurality of coils (25,25,25,25) mounted on the frame for creating controllable electromagnetic fluxes for urging the armature to pivot about the point. In one aspect, the improvement comprises the coils being positioned such that the entire volume of each of the coils is entirely within an imaginary hemisphere (h) generated about the point. This hemisphere is of arbitrary radius, but encompasses the coils. In another aspect, the improvement comprises the armature having a magnetically-conductive surface (33) which is configured as a segment of a sphere.

13 Claims, 1 Drawing Sheet

TWO-AXIS POINTING MOTOR

TECHNICAL FIELD

The present invention relates generally to multiple-axes pointing motors and mechanisms, and, more particularly, to a two-axis pointing motor which may be used to position or aim a mirror, sensor, antenna, thrust vector, or the like.

BACKGROUND ART

Most commercially-available pan/tilt mechanisms are motor-on-motor devices. One rotary motor, such as a brushless DC motor or a stepper motor, is used to move an object about one axis, while a second motor controls motion about another axis. Because the second motor must drive the first along with the object, this type of design is inherently inefficient. While these devices may be powerful and reliable, they tend to be large, heavy, slow, and to require high power.

One type of device is representatively shown in U.S. Pat. No. 5,204,573 "Benderson et al."). This reference appears to disclose a gimbaled magnet surrounded by three orthogonally-positioned coils, with no magnetic pole structure. This patent apparently teaches that the coil whose axis is aligned with the magnet axis cannot produce torque, so effectively only two coils are needed. This patent shows two forms, a moving-magnet fixed-coil form and moving-coils fixed single-axis magnet form. This device orients a magnet with respect to a set of coils, but the coils completely surround the magnet and must be pulled apart to create an opening. Aside from being inconvenient, this distorts the magnetic field which controls the magnet. In fact, it is necessary to calibrate this motor using a procedure specifically designed for the device. The control strategy is open-loop, and so has limited accuracy, especially in applications involving a changing environment.

U.S. Pat. No. 4,785,212 ("Downer et al.") discloses an annular magnet (or solenoid coil) carried in a spherical housing by magnetic suspension bearings, and acted upon by three opposed pairs of coils on the surface of the housing to control the angular position of the magnet axis in two directions. The positioning of the coils on the surface of the sphere is not defined, but they are shown diagrammatically as being on three orthogonal axes.

U.S. Pat. No. 4,600,871 ("Idoguki et al.") appears to disclose a magnet in a spherical bearing with its axis perpendicular to two radial flux fields in a plane established by paired polepieces at right angles to one another and pairs of coils operatively arranged to produce flux.

U.S. Pat. No. 5,892,310 ("Kempas") appears to disclose a hemispherical arrangement of a shell carrying segmented coil pairs in a fixed permanent magnet field.

DISCLOSURE OF THE INVENTION

The present invention provides a two degree of freedom actuator which allows servocontrol about the two axes simultaneously. In each case where these axes are orthogonal, the device can be considered a pan/tilt mechanism. As noted above, applications typically include, but are not limited to, mirror aiming, sensor or antenna pointing, thrust vectoring, tracking, navigation and the like.

The moving member, or armature, consists of a hemispherical permanent magnet mounted on a gimbal. Four coils are mounted orthogonally on a frame, configured as though on the sides of a regular pyramid. The convex face of the magnet (which corresponds to either the north or south magnetic pole) faces the coils, so that the payload faces outwardly from the bottom of the pyramid configuration.

When equal current is applied to all four coils, the magnet is pulled equally in four directions due to the electromagnetic interaction between the coil flux and the magnet flux. This holds the magnet in its centered (zero angle) position. When current is decreased in one coil and increased by the same amount in the opposite coil, a differential force is generated on the magnet. Consequently, a torque is generated about the corresponding axis of motion. This causes the armature to rotate to a position along that axis between the coils, proportional to the ratio of currents in the coils. By similarly varying the currents in the other two coils, both axes of motion can be controlled simultaneously, positioning the armature anywhere within the plane described by these two axes.

The input to the coils depends on whether or not a self-centering mechanism is used. The device can be made so that the armature magnetically centers itself when all coils are de-energized. This may be useful for applications which require a fail-centered mode or a passive "home position" in the event of a failure. In this case, the current in the coils would reverse polarity as the armature has crossed the zero-angle position. In the case where no self-centering is required, the current in each coil would vary from zero to some maximum value.

Accordingly, with parenthetical reference to the corresponding parts, portions or surfaces of the disclosed embodiment, merely for purposes of illustration and not by way of limitation, the present invention provides an improvement in a two-axis pointing motor (20) having a frame (21) and a armature (22). The armature has an axis (x-x) passing through a point (P). The armature is mounted on the frame for controlled omni-directional pivotal movement of the axis about the point. The motor has a permanent magnet (24) mounted on the armature, and has a plurality of coils (25,25,25,25) mounted on the frame for creating controllable electromagnetic fluxes for urging the armature to pivot about the point. The improvement broadly comprises: the coils being positioned such that the entire volume of each of the coils is entirely within an imaginary hemisphere (h) generated about the point. This hemisphere is of arbitrary radius, but encompasses the coils.

In the preferred embodiment, the permissible range of motion of the axis is within the hemisphere. Each coil may have a winding axis, and the coil axes are subsequently arranged to radiate outwardly from the point within the hemisphere. Each coil may have an annular end face tangent to the surface of the imaginary hemisphere. Each such coil end surface may be arranged on a side of an imaginary regular pyramid, such as having four sides. Each coil may have a flux-conductive core. The armature may have a magnetically-conductive surface that is configured as a segment of a sphere. This surface may be provided on the magnet. The magnet may have polarized domains that are parallel to the armature axis. A gimbal may be operatively arranged between the armature and the frame. Alternatively, a spherical bearing may be connected between the armature and frame.

In another aspect, the invention provides another improvement in a two-axis pointing motor of the type heretofore described. In this form, the improvement comprises: the armature having a magnetically-conductive surface which is configured as a segment of a sphere. In this form, the frame may have a concave surface configured as a segment of a sphere that is arranged to face the armature surface to form a spherical bearing therebetween.

Accordingly, the general object of the invention is to provide an improved two-axis pointing motor.

Another object is to provide an improved two-axis pointing motor which may be used to position mirrors, sensors, antennas, for thrust vectoring purposes, tracking or navigational purposes.

Another object is to provide a simplified structure that is capable of use as a two-axis pointing motor.

These and other objects and advantages will become apparent from the for going and on going written specification, the drawing, and the appended claims.

DESCRIPTION OF THE PREFERRED EMBODIMENT(S)

Figure 1:
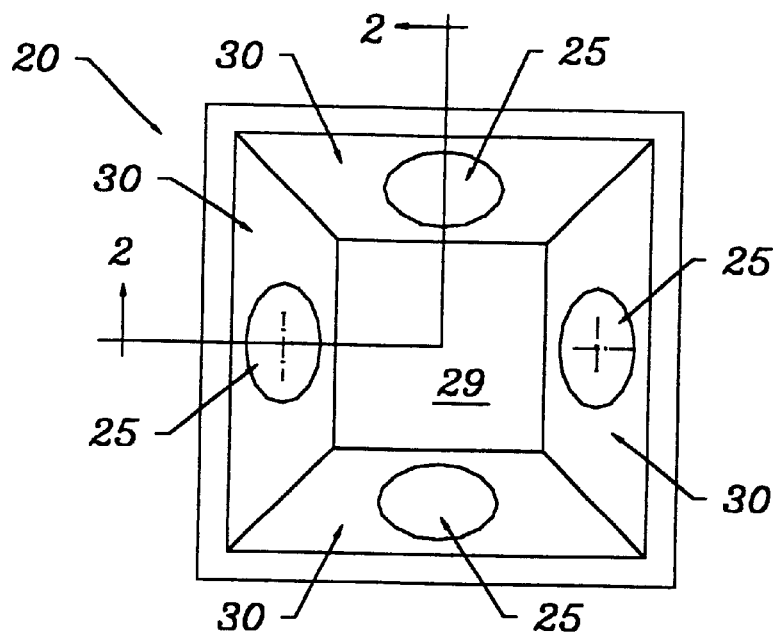
FIG. 1 is a top plan view of a first preferred embodiment of the improved two-axis pointing motor.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Figure 2:
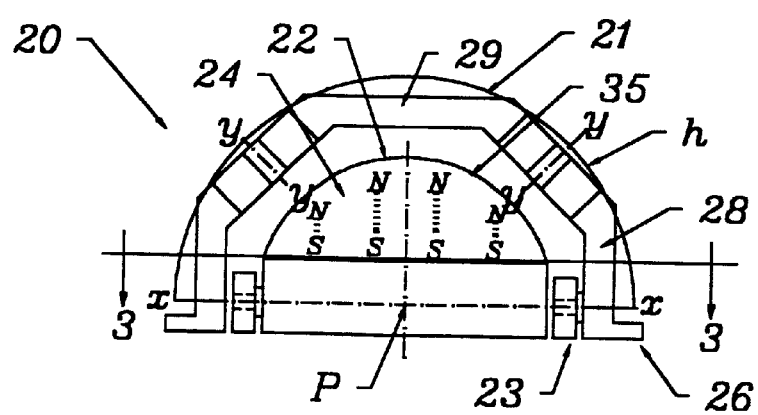
FIG. 2 is a fragmentary vertical sectional view thereof, taken generally on line 2—2 of FIG. 1.

Referring now to the drawings, and, more particularly, to FIGS. 1 and 2 thereof, the present invention broadly provides an improved two-axis pointing motor, generally indicated at 20. As best shown in FIG. 2, the improved motor has a frame, generally indicated at 21, and an armature, generally indicated at 22, arranged within and mounted on the frame by means of a gimbal assembly, generally indicated at 23. The armature has an axis indicated at x-x which passing through an imaginary point P. The armature is mounted on the frame for controlled omni-directional pivotal movement of the axis about the point. The motor has a hemispherical magnet 24. A plurality of coils, severally indicated at 25, are operatively mounted on the frame for creating controllable electromagnetic fluxes urging the armature to pivot about the point.

As best shown in FIGS. 1 and 2, frame 21 is a specially-configured member having a peripheral out-turned flange 26; four vertical side walls, severally indicated at 28; an uppermost rectangular top portion 29; and four upwardly- and inwardly-inclined surfaces, severally indicated at 30, joining the upper margins of the side walls with the outer-most margins of the top. Thus, the frame resembles an imaginary rectangular pyramid. One of coils 25 is operatively mounted on each of surfaces 30, and the coils are electrically connected so that opposing coils are arranged in operative pairs.

Figure 3:
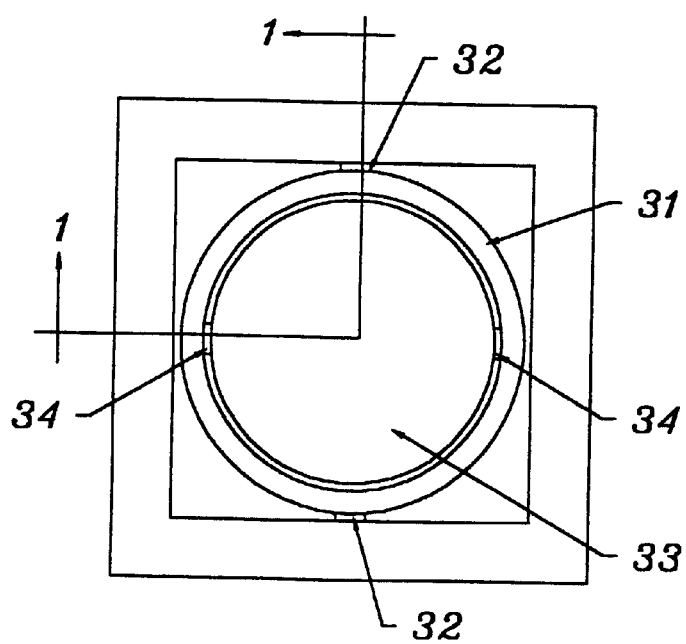
FIG. 3 is a horizontal sectional view thereof, taken generally on line 3—3 of FIG. 2.

As best shown in FIGS. 2 and 3, the gimbal assembly includes a ring 31 that is journaled on the frame at 32, 32. A circular disk 33 is journaled on the ring by pivots indicated at 34, 34. The hemispherical magnet 24 is operatively mounted on the uppermost face of disk 33. The magnet has polarized domains that are parallel to the armature axis x-x, these domains being indicated by the N-S lines in FIG. 2. Alternatively, the gimbal could readily be replaced by a spherical bearing. In other words, the frame might be alternatively provided with a concave spherically-segmented surface in which the convex spherically-segmented surface of the magnet might be journaled. A person skilled in the art will readily appreciate that the magnet has a magnetically-conductive surface 35. Each of the coils as a winding axis, indicated at y-y in FIG. 2, and these coil axes are substantially arranged to radiate outwardly from the point P.

In operation, the opposed magnets are selectively energized in cooperative pairs to selectively displace the magnet along the two orthogonal axes defined by the opposing pairs. In other words, in FIG. 1, one of these axes would be horizontal, and the other vertical.

The present invention contemplates that many changes and modifications may be made. For example, while it is presently preferred that the frame have an imaginary regular pyramidal shape, this may be changed or desired as may be necessary. As indicated above, the magnet may be mounted for omni-directional movement relative to the frame by a gimbal arrangement, or by means of a spherical bearing, or by some other means, all as desired. The various coils may preferably have flux-conductive cores. The hemisphere (h) is of arbitrary radius, but encompasses the coils.

Therefore, while the preferred form of the improved two-axis pointing motor has been shown and described, and several modifications thereof discussed, persons skilled in this art will readily appreciate that various additional changes and modifications may be made without departing from the spirit of the invention, as defined and differentiated by the following claims.

What is claimed is:

1. In a two-axis pointing motor having a frame and an armature, said armature having an axis passing through a point, said armature being mounted on said frame for controlled omni-directional limited-angle pivotal movement of said axis about said point, said motor having a permanent magnet mounted on said armature and having a plurality of coils mounted on said frame for creating controllable electromagnetic fluxes for urging said armature to pivot about said point, the improvement comprising:

said armature having a magnetically-conductive surface which is configured as a segment of a hemisphere centered about said point.

2. The improvement as set forth in claim 1 wherein each coil is mounted on said frame such that the volume of each coil and said armature surface is entirely within an imaginary hemisphere generated about said point when said armature axis is centered within its permissible range of motion.

3. The improvement as set forth in claim 2 wherein the permissible range of motion of said axis is within said hemisphere.

4. The improvement as set forth in claim 2 wherein each coil has a winding axis, and wherein said coil axes are arranged to radiate substantially radially outwardly from said point within said hemisphere.

5. The improvement as set forth in claim 4 wherein each coil has an annular end surface arranged so as to be substantially tangent to a point on said imaginary hemisphere.

6. The improvement as set forth in claim 4 wherein each coil end surface is arranged on a side of an imaginary regular pyramid.

7. The improvement as set forth in claim 6 wherein said imaginary pyramid has four sides.

8. The improvement as set forth in claim 1 wherein each coil has a flux-conductive core.

9. The improvement as set forth in claim 1 wherein said surface is provided on said magnet.

10. The improvement as set forth in claim 1 wherein said magnet has polarized domains that are parallel to said armature axis.

11. The improvement as set forth in claim 1 and further comprising a gimbal operatively arranged between said armature and frame.

12. The improvement as set forth in claim 1 and further comprising a spherical bearing arranged between said frame and armature.

13. The improvement as set forth in claim 1 and further comprising a spherical bearing between said armature and frame, and wherein said hemispherical surface is a part of said bearing.

* * * * *